United States Patent [19]

White et al.

[11] 4,229,284
[45] * Oct. 21, 1980

[54] CORROSION CONTROL METHOD USING METHOXYPROPYLAMINE (MOPA) IN WATER-FREE PETROLEUM AND PETROCHEMICAL PROCESS UNITS

[75] Inventors: James A. White, Richmond; Thomas C. Maynard, Houston, both of Tex.

[73] Assignee: Nalco Chemical Co., Oak Brook, Ill.

[*] Notice: The portion of the term of this patent subsequent to Dec. 13, 1994, has been disclaimed.

[21] Appl. No.: 905,814

[22] Filed: May 15, 1978

Related U.S. Application Data

[63] Continuation-in-part of Ser. No. 743,898, Nov. 22, 1976, abandoned.

[51] Int. Cl.³ .................. B01D 3/34; C10G 7/10; C23F 11/14
[52] U.S. Cl. .................. 208/348; 422/12; 252/392; 208/47; 203/7
[58] Field of Search .................. 422/7, 12, 16; 203/7; 252/392; 208/47, 348

[56] References Cited

U.S. PATENT DOCUMENTS

| | | | |
|---|---|---|---|
| 2,372,624 | 3/1945 | Carpender | 260/584 |
| 3,078,223 | 2/1963 | Thompson | 422/7 |
| 3,203,904 | 8/1965 | Brown | 422/16 |
| 3,324,719 | 8/1967 | Wolf et al. | 422/16 |
| 3,447,891 | 6/1969 | Crawford | 203/7 |
| 3,458,453 | 7/1969 | Kautsky | 203/7 |
| 3,646,167 | 3/1972 | Sawyer | 422/16 |
| 3,779,905 | 12/1973 | Stedman | 203/7 |
| 3,799,876 | 3/1974 | White et al. | 252/392 |
| 3,819,328 | 6/1974 | Go | 203/7 |
| 4,062,764 | 12/1977 | White et al. | 422/7 |

FOREIGN PATENT DOCUMENTS 1545248   8/1969   Fed. Rep. of Germany .

*Primary Examiner*—Bradley R. Garris
*Attorney, Agent, or Firm*—John G. Premo; Robert A. Miller

[57] ABSTRACT

A method of inhibiting corrosion in separation units of water-free petroleum and petrochemical hydrocarbon processing systems which comprises adding a compound corresponding to Formula I below either alone or in combination with a film-forming amine corrosion inhibitor to the hydrocarbon being processed:

Formula I

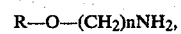

R—O—(CH₂)nNH₂, wherein n is 2 or 3 and R is a lower alkyl radical of not more than 4 carbon atoms.

9 Claims, No Drawings

CORROSION CONTROL METHOD USING METHOXYPROPYLAMINE (MOPA) IN WATER-FREE PETROLEUM AND PETROCHEMICAL PROCESS UNITS

This application is a continuation-in-part of copending Ser. No. 743,898 filed Nov. 22, 1976, now abandoned.

BACKGROUND OF THE INVENTION

The present invention is directed to the prevention or control of corrosion in the separation units of water-free petroleum hydrocarbon processing systems such as refinery and petrochemical units. Typical of the refinery systems are catalytic reformers, hydrosulfurization units and debutanizer towers. Typical petrochemical systems are benzene and styrene units.

In particular, the subject invention entails a method for eliminating corrosion which occurs during the distillation process of refining and petrochemical systems utilizing water-free feeds. The most troublesome corrosion sites appear in distillation overheads and in related down stream processing equipment. The corrosion problem, it is believed, arises due to the presence of acidic species in the various process feeds.

Corrosion occurs, for example, on the metal surfaces of fractionating towers, trays within these towers, heat exchangers, receiving tanks, connecting pipes, etc. Serious corrosion appears in condensers and in overhead lines leading from fractionating towers. (The overhead line of concern here is used to connect the distillation tower to the condensers.) The acidic materials present in the separation unit charge, and the overhead product include HCl, hydrogen sulfide, hydrogen cyanide, $CO_2$, etc.

The corrosion problems experienced in the water-free petroleum and petrochemical system separation units with which the present invention is concerned are similar to the corrosion problems experienced in "wet" crude oil distillation. However, as discussed in more detail below, we and others skilled in the art have experienced deposit formation problems in the water-free systems which are much more severe than those seen in "wet" systems. These deposits significantly reduce separation unit capacity and promote corrosion at the deposition sites.

It may be useful to look at the special need for this corrosion inhibitor in the catalytic reformer. The catalytic reformer handles a light hydrocarbon cut which is pretreated to remove nitrogen and sulfur and to screen particulate matter. This pretreated feed is then brought into contact with a catalyst (generally noble metal and very expensive, i.e. platinum or palladium). The catalyst is usually activated by an excess of organic chloride containing-compound such as ethylene dichloride which releases chlorine to the catalyst. The excess bleeds off over a period of time: 1000-2000 ppm for 1-2 weeks is not uncommon. This chlorine eats up the overhead section and, therefore, constitutes a significant source of corrosion problems. Since the catalytic reformer is a water-free system, present corrosion inhibitors cannot be used without serious deposition problems. We have, however, found a composition effective in overcoming this serious chlorine induced corrosion without causing concomitant deposit formation problems.

When we use the term "water-free," we mean systems whose separation units see about 1% by weight of water based on the overhead product. In practice, water-free systems generally contain about ½-1% by weight of water in the overhead product. When we use the term "wet," we mean separation unit with overhead product containing greater than 1% by weight of water. Generally, wet systems contain 2-15% by weight of water with an average of 4-5% water.

Numerous corrosion inhibitors useful in wet systems (e.g. crude oil refining) have been tested in the separation units of the water-free systems described above. Prior to our discovery of the invention described herein, not one of the wet system inhibitors proved practically useful in water-free systems. Although inefficiency or cost-ineffectiveness may be a factor in rejecting some of the wet system inhibitors, the overwhelming reason for the rejection of the prior known inhibitors was deposit formation. As noted in the examples below, the wet system corrosion inhibitors when utilized in water-free systems form highly objectionable deposits which prevent efficient operation of the separation apparatus and, in many cases, cause plugging of lines, etc.

One common corrosion inhibitor—ammonia—it has been found, causes lesser deposit problems. However, this material produces severe corrosion through its hydrochloride salt.

A specific corrosion inhibitor utilized in crude oil (wet system) distillation is morpholine. This compound is used either alone or in combination with film-forming inhibitors as disclosed and claimed in U.S. Pat. No. 3,447,891, the disclosure of which is hereby made a part hereof. Another commercial product used in these crude oil systems is hexamethylene diamine. We have found that neither of these compounds is effective in water-free refining or petrochemical systems. While it has been found that over long periods of time in wet systems, hydrochloride salts of these amines tend to form deposits in the wet system distillation columns, column pump-arounds, overhead lines and overhead heat exchangers, in dry systems, the deposits formed over even relatively short periods of times are intolerable.

Thus, the discovery of a corrosion inhibitor which performs in water-free separation units without significant and troublesome deposit formation would constitute an important contribution to the art.

OBJECTS

It is therefore an object of the present invention to provide a method of inhibiting corrosion in water-free petroleum refining and petrochemical system separation units.

It is another important object of the present invention to provide such a corrosion inhibitor which does not tend to form significant deposits when utilized for practical periods of time.

Yet another object of the present invention is to provide such a corrosion inhibitor which is compatible with film-forming inhibitors.

Other objects will appear hereinafter.

THE INVENTION

The invention comprises the discovery that the addition of a small amount of a composition corresponding to Formula I below:

Formula I $$R-O-(CH_2)_n NH_2$$

wherein n is 2 or 3 and R is a lower alkyl radical of not more than 4 carbon atoms to the distilland of a water-free petroleum or petrochemical hydrocarbon processing system separation unit will control or eliminate corrosion that ordinarily occurs at or beyond the point of initial condensation of vapors within the distilling unit. This composition, if employed per the teaching of the present invention, will have no adverse effect on copper alloys and the like.

Illustrative of compounds falling within composition 1 are methoxypropylamine (MOPA), ethoxypropylamine, methoxyethylamine and the like. The most preferred compound is MOPA. To simplify further discussions herein of the invention, it will be illustrated by using MOPA although it is understood that the other compounds falling within Formula I are also operative.

A very important aspect of the present invention is the discovery that MOPA will control or prevent corrosion without forming significant or troublesome deposits over either short or prolonged periods of time. In contrast to MOPA, other presently known corrosion inhibitors tested in water-free systems cause significant deposit formation. MOPA is thus far superior to the known corrosion inhibitors.

The explanation for this outstanding characteristic of MOPA may lie in the apparent ability to MOPA to form liquid hydrochloride salts under dry conditions at ambient temperature. Although the salts may separate from the hydrocarbon stream, they do not form significant solid deposits.

MOPA can be added to the separation unit at any convenient point after the hydrocarbon leaves the reactor portion of the system for treatment in the separation unit. A convenient point of addition would be just before the hydrocarbon passes through the distillation column. The inhibitor can also be pumped directly into the gaseous overhead line. The particular point at which MOPA is added will depend largely on the design of the particular equipment and the point where greatest corrosion problems are manifested.

The dosage level of MOPA will depend on system parameters as well as the nature of the hydrocarbon. Corrosion inhibiting amounts will have to be determined on a case by case basis. Generally, the dosages will lie in the range of 5-500 ppm. Since the corrosion is caused by the acid content of the hydrocarbon, a useful dosage approach may be to adjust the pH of the first condensate. In this case, the pH should be adjusted to above pH 4.0 and preferably above pH 5.0. Unlike systems utilizing ammonia as a corrosion inhibitor, it is not essential that the pH be maintained below a given point—upper limits depend largely upon economic considerations.

As noted earlier, MOPA may readily be used to control corrosion in conjunction with film-forming corrosion inhibitors. Such film-forming inhibitors operate most economically at a pH above 4.5. Since MOPA is particularly effective in increasing the pH of the initial condensate, the amount of film former that is required is thus substantially lessened.

Among the film-forming corrosion inhibitors which can be used in conjunction with MOPA to provide an overall system of protection are compounds formed by reacting certain aliphatic monoamines with polymerized fatty acids under salt-forming conditions.

The aliphatic monoamines used in preparing film-forming inhibitors are those amines having the general structural formula:

$$R-\underset{\underset{R_3}{|}}{\overset{\overset{R_2}{|}}{N}}$$

where R is an aliphatic hydrocarbon radical of 8 to 22 carbon atoms in chain length and both $R_2$ and $R_3$ are selected from the group consisting of hydrogen and an aliphatic hydrocarbon radical of 1 to 22 carbon atoms in chain length.

The above structural formula includes both primary and secondary aliphatic monoamines as well as the tertiary aliphatic monoamines. Illustrative compounds coming within the above general formula include such primary amines as n-dodecyl amine, n-tetradecyl amine, n-hexadecylamine, lauryl amine, myristyl amine, palmityl amine, stearyl amine, and oleyl amine. Other commercially available primary amines include coconut oil amine, tallow amine, hydrogenated tallow amine and cottonseed oil amine. Useful secondary amines are dilauryl amine, dimyristyl amine, dipalmityl amines, distearyl amine, dicoconut amine and dihydrogenated tallow amine. In the case of many of the above amines, it will be noted that the source of alkyl substituent on the organic nitrogen is derived from a mixed vegetable oil or animal fat. For purposes of convenience, these compounds have been named from the derivative alkyl-containing components. This system of nomenclature, particularly in the case of alkyl substituents derived from naturally occurring products such as fats, oils and the like, is used for purposes of simplification. It is believed that those familiar with the art will readily understand that the alkyl substituent varies in the case of a coconut substituent with the alkyl groups containing from 8 to 18 carbon atoms in chain length. Similarly, in the case of hydrogenated tallow, the alkyl substituent will vary from about 12 to 20 carbon atoms in chain length.

In addition to using primary or secondary amines as exemplified above, tertiary amines such as octyl dimethyl amine, octadecyl dimethyl amine, octadecyl methyl benzyl amine, hexyldiethylamine, trilaurylamine, tricoconut amine, tricaprylyl amine, and similar type compounds also may be used.

Preferred aliphatic primary monoamines are amines having the general structural formula:

$$R-NH_2$$

wherein R is an aliphatic hydrocarbon radical of from 8 to 22 carbon atoms in chain length. A preferred material of this type is the commercial product "Armeen SD" sold by the Armour Industrial Chemical Company which is known generically to the art as Soya amine. As applied to the above formula the R group is mixed aliphatic radical which has the following components:

| | Percent |
|---|---|
| Hexadecyl | 10 |
| Octadecyl | 10 |
| Octadecenyl | 35 |

|  | Percent |
|---|---|
| Octadecadienyl | 45 |

Out of the group of tertiary amines listed above, one of the most effective is dimethyl hydrogenated tallow amine. This preferred species may be considered as an ammonium molecule which has had its three hydrogen atoms replaced by three alkyl groups. Two of these alkyl groups are methyl and the third is a mixed alkyl substituent derived from hydrogenated tallow.

A representative analysis of the mixed radicals of the hydrogenated tallow group is as follows:

|  | Percent |
|---|---|
| Myristic | 2 |
| Palmitic | 29 |
| Stearic | 68 |
| Oleic | 1 |

One of the preferred commercial sources of this tertiary amine is "Armeen $M_2HT$" sold by Armour Industrial Chemical Company.

The polymerized fatty acids are well known and have been described in numerous publications. Excellent descriptions of these materials may be found in Industrial and Engineering Chemistry, 32, page 802 et seq. (1940), and in the text "Fatty Acids" by Klare S. Markley, published by Interscience Publishers, Inc., New York City, 1947, pages 328 to 330. A specific example of such a polymer which has been found to be particularly useful is one which is prepared as a by-product of the caustic fusion of caster oil in the manufacture of sebacic acid. This material is composed primarily of dicarboxylic acids derived by bimolecular addition in an olefinic polymerization where linkage occurs through the opening of at least two unsaturated bonds. Typical properties of a material so obtained are as follows:

| Acid value | 150 |
|---|---|
| Saponification value | 172 |
| Unsaponifiable matter, percent | 3.7 |
| Iodine No | 36 |
| Moisture content, percent | 0.86 |

The material is, of course, not pure but predominantly contains dicarboxylate polymers having about 34 to 36 atoms. A suitable commercial source of this dimer acid is Harchem Division of Wallace and Tiernan, Inc., and is known as "Century D-75 Acid."

A typical film-forming corrosion inhibitor useful in conjoint activity with MOPA may be prepared by combining 1 weight part of "Armeen SD" with 2.57 weight parts of a polymerized fatty acid obtained as the residue of a dry distillation of caster oil with sodium hydroxide and reacting the mixture with stirring at a temperature of 60° C. for 20 minutes. The final reaction product is then dispersed in equal weight parts of a heavy aromatic solvent.

Another useful film-forming corrosion inhibitor composition is prepared by heating 14 parts of "Armeen $M_2HT$" to the melting point and adding thereto 36 parts of "Century D-75 Acid." The mixture was reacted for 10 minutes at 130°–150° F. and the resultant product added to a heavy aromatic solvent in equal proportions by weight of product to solvent.

| Distillation range | mm | 760 |
|---|---|---|
| Initial boiling point | °C. | 171 |
| Percent: |  |  |
| 10 | °C. | 184 |
| 50 | °C. | 230 |
| 90 | °C. | 260 |
| End point | °C. | 278 |

In reacting the above recited amines with polymerized fatty acids to obtain the film-forming compositions, care should be taken to maintain salt-forming conditions. This is done primarily by using reaction temperatures of from 20° to 100° C., and by avoiding the presence of materials which cause the splitting out of water. This environment is sometimes referred to as "neutralizing conditions". It is the salt producible from the above listed reactants which is of primary interest in the instant invention. Further care must be taken in conducting the reaction to eliminate the possibility of the presence of free amines in the final reaction product. Reaction proportions conducive to accomplishing this typically include the above recited use of a weight ratio of typical polymer to typical monoamine of 2.57:1.

Additional film-forming compositions that can be used in conjunction with the subject inhibitor include those disclosed in U.S. Pat. No. 3,003,955.

EXAMPLES

Example 1

The ability of MOPA to prevent initial condensate corrosion in water-free separation units without forming significant deposits was determined as set forth below. Testing was carried out with MOPA along with other neutralizing amines to determine relative efficacy from the standpoint of preventing corrosion. Also, the ability of MOPA to perform without forming deposits under normal conditions of use was investigated.

A laboratory test unit was constructed to evaluate the invention. The unit consisted of a two-inch diameter, fifteen-tray, glass Oldershaw column fitted with a reboiler and overhead system similar to crude distillation units. Preheated naphtha was charged into the column at Tray 5 where it cascaded downward and mixed with hot vapor rising from the reboiler. Usually, small sidecuts were taken from Tray 10. Warm reflux was pumped from the overhead receiver back to Tray 15 (top tray) to partially cool the hot vapors coming up the column and going overhead.

Either a dipropylene glycol (DPL) and hydrochloric acid complex or dry HCL gas provided hydrochloric acid vapor for the test unit. The acid vapor was injected into the top section of the reboiler. 50 ppm or less of water were present in the unit feed overall (dissolved in the naphtha charged to the unit).

Generally, heated corrosion inhibitor was fed into the reflux line to neutralize the acid vapor coming up the column. Deposit formation was observed visually and by chloride analysis of the charge and effluent streams. At the end of each run, the column head was removed and wash water was poured into the column. This wash water was partially refluxed overhead to remove deposits in the overhead line. The two samples of wash water resulting from washing the column and overhead were analyzed for chlorides obtained from each source and compared with the amount of chlorides charged to the unit.

In order to provide a satisfactory test in a limited amount of time, the test unit was operated on a continuous basis and the amount of hydrochloric acid charged was 50 ppm active basis overhead product—about 15–20 times the level usually observed in a separation unit. Operating conditions were selected to provide a satisfactory test in a 20–24 hour-period.

To evaluate the invention and compare it against a typical wet system amine, the following compositions were tested:

Composition 1: 40% MOPA in heavy aromatic solvent;
Composition 2: 40% Morpholine in heavy aromatic solvent;
Composition 3: 40% 2-methoxyethylamine The results obtained are reported in Table I. The key quantitative data relating to inhibitor effectiveness and deposit formation reported is residual chloride in both the column and the overhead. Analysis of Table I shows superior performance for MOPA and methoxyethylamine.

TABLE I

EVALUATION OF NEUTRALIZERS IN DRY SYSTEMS (HEAVY NAPHTHA CHARGE)

| RUN | 1 | 2 | 3 | 4 | 5 |
|---|---|---|---|---|---|
| Amine Inhibitor Composition | 1 | 2 | 1 | 2 | 3 |
| Hours Run | 20 | 10 | 16 | 8 | 10 |
| Water, % | 0 | 0 | 0 | 0 | 0 |
| HCl Injection | DPG/HCl | DPG/HCl | Dry HCl gas | Dry HCl gas | Dry HCl gas |
| Chlorides Charged, PPM Basis OH (Overhead) | 50 | 50 | 50 | 50 | 50 |
| Chlorides in Column, % | 18 | 45 | 24 | 39 | 31 |
| Chlorides in OH, % | 14 | 17 | 35 | 39 | 24 |
| Chlorides in Solution, % | 68 | 38 | 36 | 22 | 41 |
| Flooding | No | Yes | No | Yes | No |
| Visual Inspection | Clean, Light Oily Liquid Trays 14–15, Walls, OH | Heavy Deposits Trays 14–15, Walls, OH, Condenser | Clean, Light Oily Liquid Trays 14–15, Walls, OH | Tray 15 Plugged, Heavy Deposits on Walls, OH, Condenser | Clean, Light Oily Liquid Trays 14–15, Walls, OH |

EXAMPLE 2

Tests were run to determine the effect of reducing the amount of water present in the overhead upon deposit formation. The laboratory test unit described in Example 1 was used in this experiment. The amine corrosion inhibitor used was 40% morpholine and heavy aromatic solvent. The data is reported in Table II.

Examination of quantitive chloride data and the quantitative visual inspection results indicates that reducing the amount of water present in the overhead from about 4% to about 2% greatly increases the amount of deposits remaining in the column and overhead portion of the test unit. Thus, deposit problems in water-free systems are much more severe than those in wet systems.

TABLE II

EFFECT OF WATER CONCENTRATION ON DEPOSIT FORMATION (EXXON VM&P NAPHTHA)

| Amine Inhibitor | | | |
|---|---|---|---|
| Hours Run* | 7 | 16 | 20 |
| Water, %, Basis OH | 2 | 4.4 | 4.7 |
| Chlorides Charged, PPM Basis OH | 100 | 100 | 50 |
| Chlorides in Column, % | 64 | 60 | 38 |
| Chlorides in Column OH, % | 6 | 2 | 6 |
| Chlorides in Solution, % | 16 | 38 | 52 |
| Flooding | Yes | No | No |
| Visual Inspection | Heavy Deposits Tray 15 & Wall | Heavy Deposits Tray 15 & Walls | Moderate Deposits Tray 15 & Walls |

*Not continuous runs

We claim:

1. A process for controlling corrosion in water-free petroleum and petrochemical hydrocarbon processing system separation units consisting essentially of adding a corrosion inhibiting amount of a composition having the formula R—O—(CH$_2$)nNH$_2$ wherein n is 2 or 3 and R is a lower aklyl radical of not more than 4 carbon atoms to the hydrocarbon being processed in the separation unit.

2. The method of claim 1 wherein the compound is chosen from the group consisting of methoxypropylamine, methoxyethylamine and ethoxypropylamine.

3. The process of claim 1 wherein the compound is methoxypropylamine.

4. The process of claim 1 wherein the compound is added to the hydrocarbon before said hydrocarbon is passed through the distillation column of the separation unit.

5. The process of claim 1 wherein the compound is added to the overhead line of the separation unit.

6. The process of claim 1 wherein the amount of the compound added to the hydrocarbon is sufficient to raise the pH of the initial condensate to above 4.0.

7. A process for controlling corrosion in water-free petroleum and petrochemical hydrocarbon processing system separation units consisting essentially of adding to the hydrocarbon a corrosion inhibiting amount of a film-forming amine along with a composition having the formula R—O—(CH$_2$)nNH$_2$ wherein n is 2 or 3 and R is a lower alkyl radical of not more than 4 carbon atoms in an amount sufficient to raise the pH of the initial condensate to above 4.0.

8. The method of claim 7 wherein the compound is chosen from the group consisting of methoxypropylamine, methoxyethylamine and ethoxypropylamine.

9. The method of claim 7 wherein the compound is methoxypropylamine.

* * * * *